(12) United States Patent
Sanders

(10) Patent No.: US 11,455,971 B2
(45) Date of Patent: Sep. 27, 2022

(54) CONVERSION OF GLYPHS TO IMAGES

(71) Applicant: Hewlett-Packard Development Company, L.P., Spring, TX (US)

(72) Inventor: Aaron Sanders, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/048,722

(22) PCT Filed: Jul. 19, 2018

(86) PCT No.: PCT/US2018/042848
§ 371 (c)(1),
(2) Date: Oct. 19, 2020

(87) PCT Pub. No.: WO2020/018103
PCT Pub. Date: Jan. 23, 2020

(65) Prior Publication Data
US 2021/0241714 A1  Aug. 5, 2021

(51) Int. Cl.
G09G 5/00 (2006.01)
G06T 11/20 (2006.01)
G09G 5/37 (2006.01)

(52) U.S. Cl.
CPC ............ G09G 5/003 (2013.01); G06T 11/203 (2013.01); G09G 5/37 (2013.01); G09G 2340/14 (2013.01)

(58) Field of Classification Search
CPC . G07G 1/14; G09G 5/003; G09G 5/37; G06T 11/203
See application file for complete search history.

(56) References Cited

U.S. PATENT DOCUMENTS

| | | | | |
|---|---|---|---|---|
| 6,377,261 | B1* | 4/2002 | Fernandez | G06T 11/203 345/467 |
| 7,380,725 | B2* | 6/2008 | McGill | G06Q 30/06 235/472.01 |
| 8,078,495 | B2 | 12/2011 | Zeevi et al. | |
| 8,949,144 | B2 | 2/2015 | Kim et al. | |
| 9,195,982 | B2 | 11/2015 | Orr et al. | |
| 9,257,018 | B2 | 2/2016 | Edwards et al. | |
| 2005/0263590 | A1 | 12/2005 | Branck et al. | |
| 2011/0307318 | A1 | 12/2011 | Laporte et al. | |
| 2013/0162502 | A1* | 6/2013 | Lee | H04N 21/42204 345/1.2 |
| 2014/0032344 | A1 | 1/2014 | Argue et al. | |
| 2015/0095134 | A1 | 4/2015 | Parker et al. | |

FOREIGN PATENT DOCUMENTS

EP  3176765 A1  6/2017

OTHER PUBLICATIONS

Object Management Group, "Unified POS Retail Peripheral Architecture" standard from "NRF's IT Standards Division," Chapter 22. [Online] https://www.omg.org/retail/unified-pos.htm.

\* cited by examiner

*Primary Examiner* — Samantha (Yuehan) Wang
(74) *Attorney, Agent, or Firm* — Conley Rose PC

(57) ABSTRACT

A request to access a display unit may be received via an interface. The interface may comprise a line display interface for a point of sale system. A glyph to be displayed by the display unit may be received via the interface. The glyph may be converted to an image for display by the display unit and sent to the display unit.

15 Claims, 6 Drawing Sheets

CONVERSION OF GLYPHS TO IMAGES

BACKGROUND

Point of sale units may include a display unit to show a description, quantity, or cost of items being entered as part of a sale. Point of sale systems may include a line display unit to provide information to customers during the course of a transaction. A line display unit may be specialty equipment that provides limited display functionality relative to the cost.

BRIEF DESCRIPTION OF THE DRAWINGS

Various examples will be described below referring to the following figures.

DETAILED DESCRIPTION

A display unit, such as a monitor or LED display, may provide the functionality of a line display unit, while performing additional functions when not in use as a line display unit. Computer-readable instructions executed by a processor may convert the glyphs used by line display interfaces into images for display by the display unit. When a transaction is completed, the display unit may display advertisements or other information, such as by playing videos or displaying images.

In one example in accordance with the present disclosure, a system is provided. The system comprises a processor, a display unit coupled to the processor, and storage coupled to the processor to store computer-readable instructions, wherein execution of the computer-readable instructions by the processor causes the processor to receive a request via a line display interface to access the display unit, send an access command to the display unit to enter a line display mode in response to receiving the request, receive a glyph via the line display interface to be displayed on the display unit, convert the glyph to an image, and send the image to the display unit to display.

In one example in accordance with the present disclosure, a device is provided. The device comprises a non-transitory computer-readable medium storing computer-readable instructions that, when executed by a processor, cause the processor to implement a line display interface, receive a request via the line display interface to access a display unit, receive a glyph via the line display interface to be displayed on the display unit, convert the glyph to an image, and send the image to the display unit for display.

A method comprising receiving a request via an interface to access a display unit, receiving a glyph via the interface to be displayed by the display unit, converting the glyph to an image for display by the display unit, and sending the image to the display unit, wherein the interface comprises a line display interface for a point of sale system.

A glyph is an element to be displayed or occupy space on a display. A glyph may include an alphanumeric character, such as A-Z, a-z, or 1-9, or a symbol, such as a dollar sign ("$"), a negative sign ("−"), or a "heart" symbol. A glyph may include a Unicode character, including alphanumeric characters with umlauts or dialectic marks and characters from other alphabets or non-alphabet languages, such as Cyrillic, Kanji, and pictograms. A glyph may include empty space to display, such as space used between words. Display of a glyph may vary over time, such as a blinking cursor. A glyph may be meant to blink, such as a blinking cursor glyph, or a glyph may be blinked by alternating between displaying the glyph and displaying blank space, such as alternating between displaying a cursor glyph and blank space.

Figure 1:
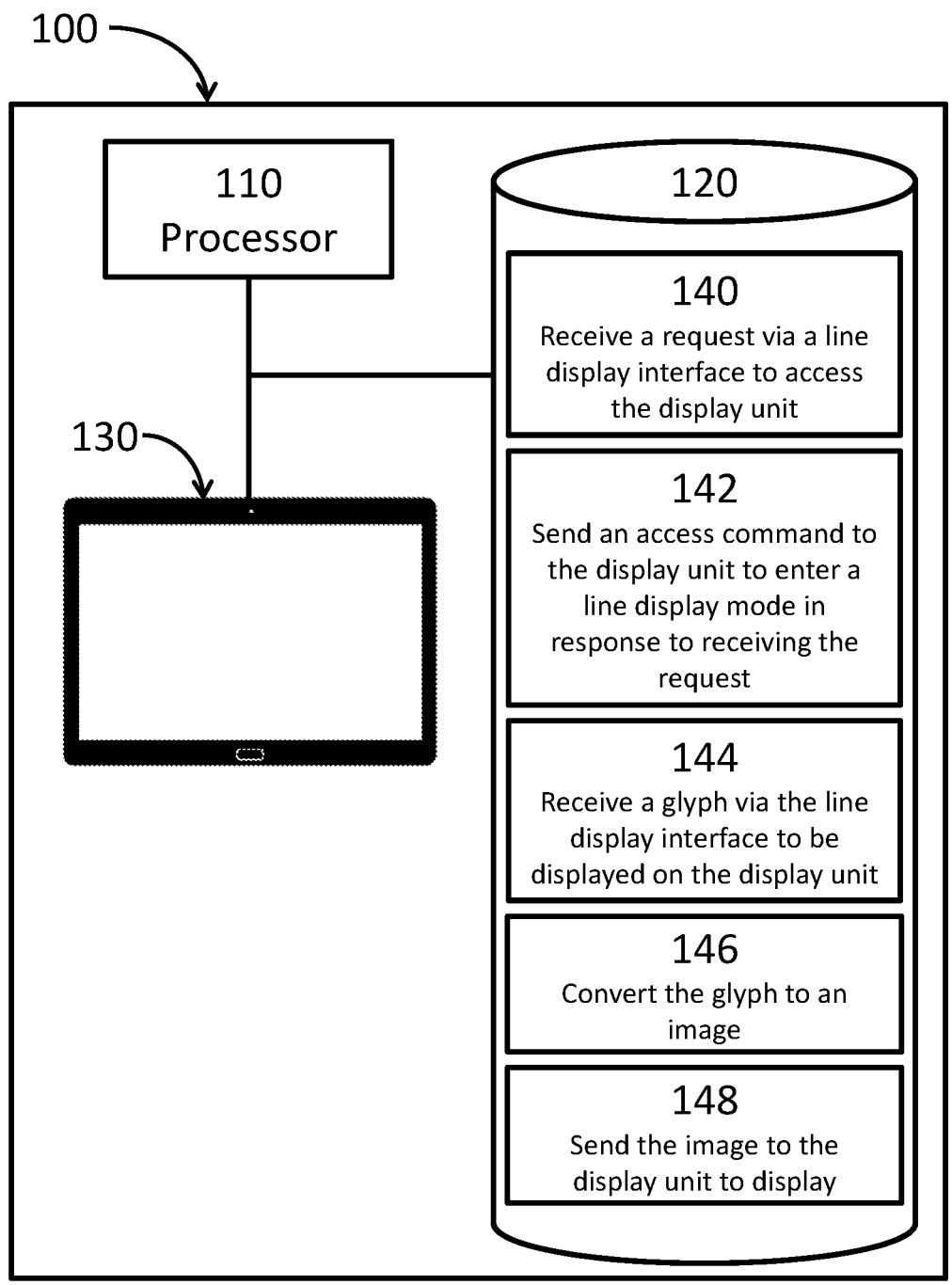
FIG. 1 shows a system with a display unit that may be used in a point of sale system in accordance with various examples.

FIG. 1 shows a system 100 with a display unit 130 that may be used in a point of sale system in accordance with various examples. System 100 may include a processor 110, storage 120, and a display unit 130, which may be coupled together, such as via a bus. Storage 120 may include computer-readable instructions 140, 142, 144, 146, 148 for execution by the processor 110.

Computer-readable instruction 140 may cause the processor 110 to receive a request via a line display interface to access the display unit 130. Computer-readable instruction 142 may cause the processor 110 to send an access command to the display unit 130 to enter a line display mode in response to receiving the request. Computer-readable instruction 144 may cause the processor 110 to receive a glyph via the line display interface to be displayed on the display unit 130. Computer-readable instruction 146 may cause the processor 110 to convert the glyph to an image. Computer-readable instruction 148 may cause the processor 110 to send the image to the display unit 130 to display.

According to various examples, the processor 110 may comprise a microprocessor, a microcomputer, a controller, a microcontroller, an FPGA (Field Programmable Gate Array) or discrete logic. The processor 110 may have a single core or multiple processing cores. Other kinds of processors 110 are also contemplated. Storage 120 may comprise volatile or non-volatile memory to store data or computer-readable instructions, such as SRAM (static random access memory), DRAM (dynamic random access memory), a hard drive, SSD (solid state drive), Flash memory, or EEPROM (electrically erasable programmable read only memory). The processor 110 and storage 120 may be coupled together, such as via an internal computer bus, Fibre Channel, USB (universal serial bus), SCSI (small computer system interface), ATA (advanced technology attachment), or by some other means. The display unit 130 may comprise a monitor, a tablet, a cell phone, a television, or another visual display. The processor 110 and display unit 130 may be coupled together, such as via HDMI (high-definition multimedia interface), USB, VGA (video graphics array), S-Video (separate video), composite video, Ethernet, WiFi (wireless fidelity), Bluetooth, or some other means.

According to various examples, the processor 110 may cause the display unit 130 to act as a line display for a point of sale system. The line display interface may comprise a physical connection for transferring electrical signals between devices. The processor 110 may implement a line display interface via computer-readable instructions for interacting with the display unit 130. The line display interface may be accessed by other devices or by other computer-readable instructions, such as other applications, executed by the processor 110. The processor 110 may receive a request via the line display interface by receiving electrical signals via a physical connection or via method calls from computer-readable instructions. Requests received via method calls of computer-readable instructions may be local calls from processor 110 or method calls from another processor, such as remote method calls received via a network connection. The line display interface may comprise the line display interface defined for a UPOS (Unified Point of Sale) system. The line display interface may comprise a set of properties, methods, or events for controlling the line display unit, such as opening a connection to the line display unit, sending glyphs for display by the line display unit, clearing the display of the line display unit, reading or setting properties of the line display unit, closing a connection to the line display unit, and events reporting on the success or failure of interactions through the line display interface. The UPOS system may be a JavaPOS (Java point of sale) system, an OPOS (OLE—object linking and embedding—point of sale) system, or other system.

According to various examples, the display unit 130 may operate in a line display mode, during which it displays lines of glyphs, such as a description of an item or a price of an item. The display unit 130 may operate in an idle mode. In idle mode, the display unit 130 may display a static image or a video. The static image or video may be used for branding purposes, such as showing the name or logo of the store where it is located. The static image or video may be used for advertising purposes, whether advertising a store, a product in the store, special sales at the store, or an advertisement unrelated to the store where it is located.

The line display interface may include a request access command, and the processor 110 may receive a request via the line display interface to access the display unit 130. The request may be received while the display unit 130 is operating in idle mode. The processor 110 may send an access command to the display unit 130. The access command may cause the display unit 130 to exit idle mode and enter line display mode. If the display unit 130 was displaying a video in idle mode, the video may be paused. In line display mode, display unit 130 may display a background image and a foreground image. The foreground image may be the lines to be displayed as the display unit 130 is acting as a line display unit. The background image may be a black background, a colored background, or some other background. The background image may include a section for display of the foreground image. For example, the background image may have a top banner including a logo of the store where the display unit is located, it may have a bottom banner including text such as "Thank you for shopping here!" and it may have an area between the top and bottom banner that is solid blue, so that a foreground image of white alphanumeric characters may be easily seen. Upon entering line display mode, the display unit 130 may display the background image and wait for further input.

The processor 110 may receive a glyph via the line display interface. The glyph may be intended for display on the display unit 130. The processor 110 may receive a line to display on the display unit 130, the line received via the line display interface. The line may comprise glyphs.

The processor 110 may convert a glyph to an image for display on the display unit 130. In converting the glyph, the processor 110 may determine an appropriate font, font size, color, or other characteristics for displaying the glyph as an image. Such characteristics may be based on settings from a configuration file, which may be stored on storage 120. The configuration file may include settings for the background image, such as particular image or video files to use in creating the background image, frame size and placement of the background image, or color of the background image. The background image may comprise an advertisement or logo. The glyph may be inverted, for example the background image may be blue with the glyphs converted into a foreground image of white when not inverted and the glyph may be converted to an image of a blue character with a white background when inverted, resulting in a negative image. In various examples, the number of glyphs may be longer than the display space for a line and the processor may cause the images to scroll the display. The scroll speed may be configured by a value in the configuration file.

The processor 110 may send the image to the display unit 130 for display. The image may be sent as an image file that is opened and displayed by the display unit 130. The image may be sent as a video signal, such as over an HDMI cable. The processor 110 may treat the display unit 130 as a monitor, such as a computer monitor. If another monitor is coupled to processor 110, processor 110 may execute computer-readable instructions to treat multiple monitors as separate workspaces, such as preventing a cursor or other element from being moved between the monitors.

The line display interface may include a relinquish access command, and the processor 110 may receive the relinquish access command via the line display interface. In response to receiving a relinquish access command, the processor 110 may cause the display unit 130 to enter an idle mode. This may cause the display unit 130 to cease displaying the line display information and display another image or video. The display unit 130 may continue displaying a video that was paused when the display unit 130 entered line display mode, or the display unit 130 may play a different video or display a different image. The processor may cause the display unit 130 to enter idle mode after a timeout period. For example, if no requests are received through the line display interface for a set period, such as 10 minutes, the processor may treat the inactivity as a failed transaction or system error, acting as if a relinquish access command had been received and causing the display unit 130 to enter idle mode.

Figure 2:
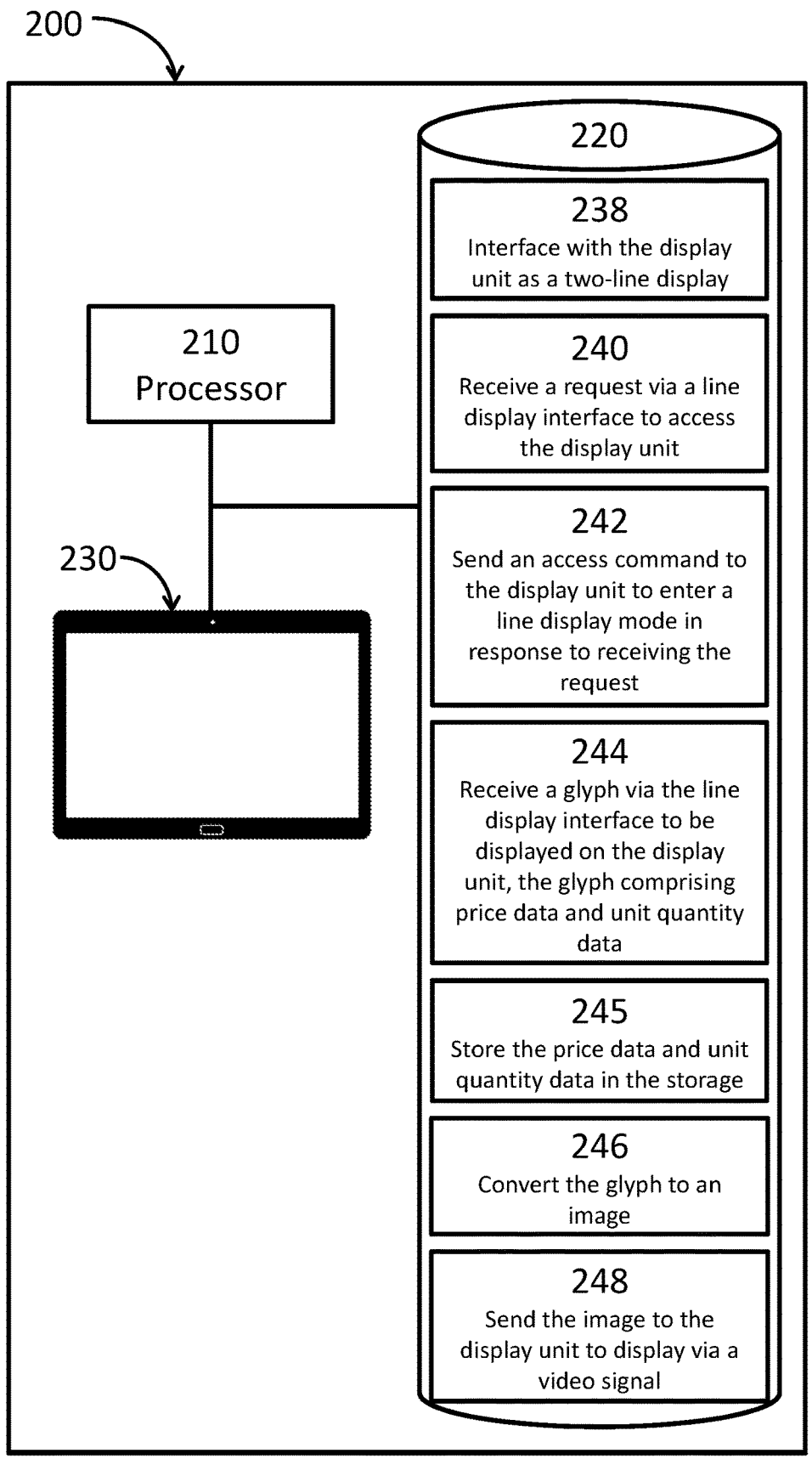
FIG. 2 shows a system with a display unit that may be used in a point of sale system in accordance with various examples.

FIG. 2 shows a system 200 with a display unit 130 that may be used in a point of sale system in accordance with various examples. The system 200 may include a processor 210, storage 220, and a display unit 230. Storage 220 may include computer computer-readable instructions 238, 240, 242, 244, 245, 246, 248 for execution by the processor 210.

Computer-readable instruction 238 may cause the processor 210 to interface with the display unit as a two-line display. Computer-readable instruction 240 may cause the processor 210 to receive a request via a line display interface to access the display unit. Computer-readable instruction 242 may cause the processor 210 to send an access command to the display unit to enter a line display mode in response to receiving the request. Computer-readable instruction 244 may cause the processor 210 to receive a glyph via the line display interface to be displayed on the display unit, the glyph comprising price data and unit quantity data. Computer-readable instruction 245 may cause the processor 210 to store the price data and unit quantity data in the storage 220. Computer-readable instruction 246 may cause the processor 210 to convert the glyph to an image. Computer-readable instruction 248 may cause the processor 210 to send the image to the display unit to display via a video signal.

The processor 210 may interface with the display unit 230 as if the display unit 230 were a two-line display. While the display unit 230 is in line display mode, the processor may convert individual glyphs or lines of glyphs to images to display on the display unit 230. The processor 210 may send additional commands to the display unit 230 controlling the display unit 230 while the display unit 230 is in idle mode or another mode.

In various examples, the glyphs received by the processor 210 may include data regarding products being purchased at a point of sale system. For example, the glyphs may describe a product being purchased, such as a UPC (universal product code) or text description like "bananas." The glyphs may indicate a quantity of items being purchased, a per-unit price, amount of sales tax, or total purchase price. The processor 210 may log information regarding a transaction, such as a UPC, units of the UPC sold, price per unit for the UPC, sales tax, or a total sales price, by storing the data in storage 220. Such data may be used for auditing the point of sale system, such as when determining if an employee has overcharged a customer, undercharged a customer, or stolen money from the till.

Figure 3:
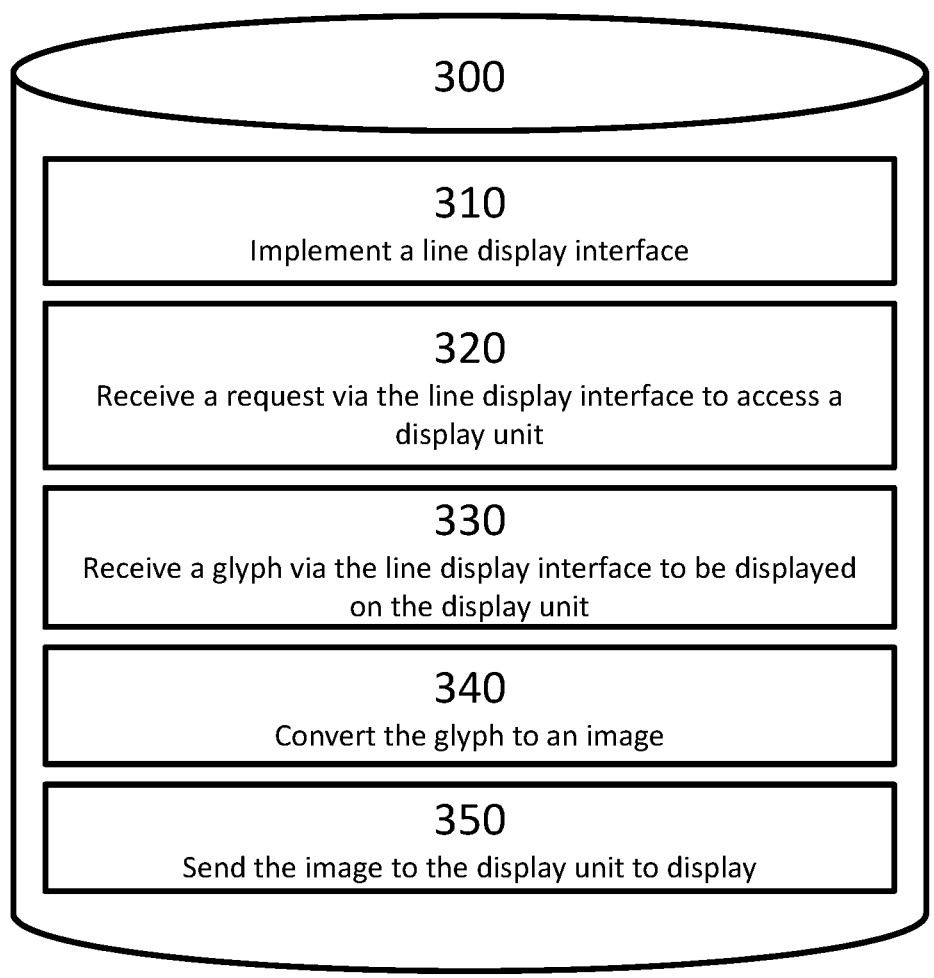
FIG. 3 shows a computer-readable medium storing computer-readable instructions for execution by a processor that may be used in a point of sale system with a display unit in accordance with various examples.

FIG. 3 shows a computer-readable medium 300 storing computer-readable instructions 310, 320, 330, 340, 350 for execution by a processor that may be used in a point of sale system with a display unit in accordance with various examples. Computer-readable instruction 310 may cause the processor to implement a line display interface. Computer-readable instruction 320 may cause the processor to receive a request via the line display interface to access a display unit. Computer-readable instruction 330 may cause the processor to receive a glyph via the line display interface to be displayed on the display unit. Computer-readable instruction 340 may cause the processor to convert the glyph to an image. Computer-readable instruction 350 may cause the processor to send the image to the display unit to display.

Figure 4:
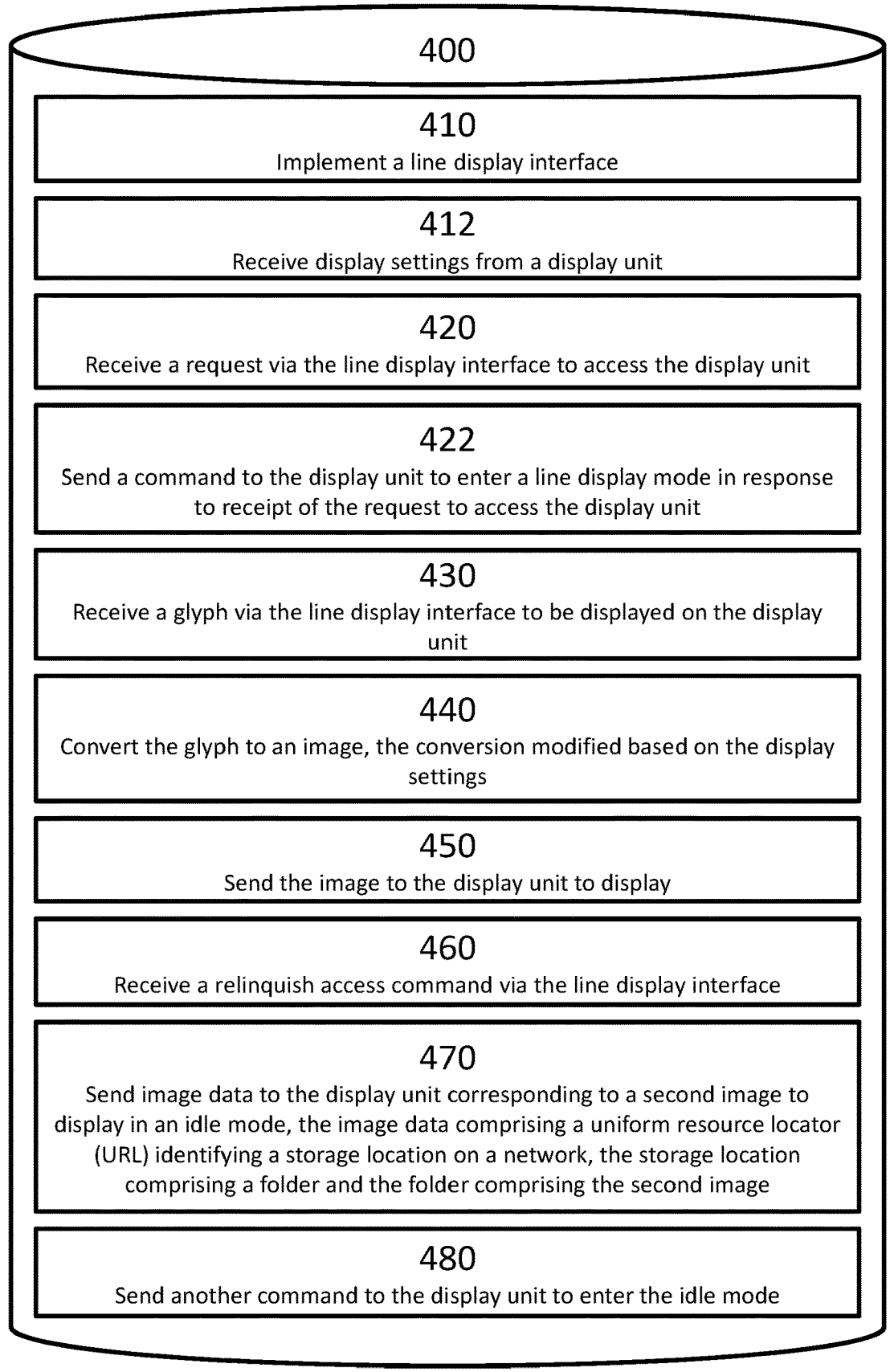
FIG. 4 shows a computer-readable medium storing computer-readable instructions for execution by a processor that may be used in a point of sale system with a display unit in accordance with various examples.

FIG. 4 shows a computer-readable medium 400 storing computer-readable instructions 410, 412, 420, 422, 430, 440, 450, 460, 470, 480 for execution by a processor that may be used in a point of sale system with a display unit in accordance with various examples. Computer-readable instruction 410 may cause the processor to implement a line display interface. Computer-readable instruction 412 may cause the processor to receive display settings from a display unit. Computer-readable instruction 420 may cause the processor to receive a request via the line display interface to access the display unit. Computer-readable instruction 422 may cause the processor to send a command to the display unit to enter a line display mode in response to receipt of the request to access the display unit. Computer-readable instruction 430 may cause the processor to receive a glyph via the line display interface to be displayed on the display unit. Computer-readable instruction 440 may cause the processor to convert the glyph to an image, the conversion modified based on the display settings. Computer-readable instruction 450 may cause the processor to send the image to the display unit to display. Computer-readable instruction 460 may cause the processor to receive a relinquish access command via the line display interface. Computer-readable instruction 470 may cause the processor to send image data to the display unit corresponding to a second image to display in an idle mode, the image data comprising a uniform resource locator (URL) identifying a storage location on a network, the storage location comprising a folder and the folder comprising the second image. Computer-readable instruction 480 may cause the processor to send another command to the display unit to enter the idle mode.

In various examples, the processor may receive display settings from the display unit. The computer-readable medium 400 may store the display settings in a settings file. Such a settings file may be stored on computer-readable medium 400 when installing the display unit. The display settings may include information regarding the display size, display resolution, color settings, or whether it is a touch screen display. The processor may convert the glyph to a different image based on the display settings. For example, a larger font size may be used with a larger display size. The display size may also affect how many lines are displayed. A smaller display unit may be treated as a two-line display, while a larger display unit may be treated as a four-line display. The display size may also affect how many glyphs are displayed per line.

In various examples, the processor may send image data to the display unit for use when the display unit is in idle mode. The image data may be an image or video. The image data may be a URL identifying a storage location on a network accessible by the display unit. The storage location may comprise a folder with images or videos to be displayed. The processor may identify a specific image or video to be used. If no specific image or video is specified, the display unit may rotate through the available content, whether randomly, round-robin, or by another process.

Figure 5:
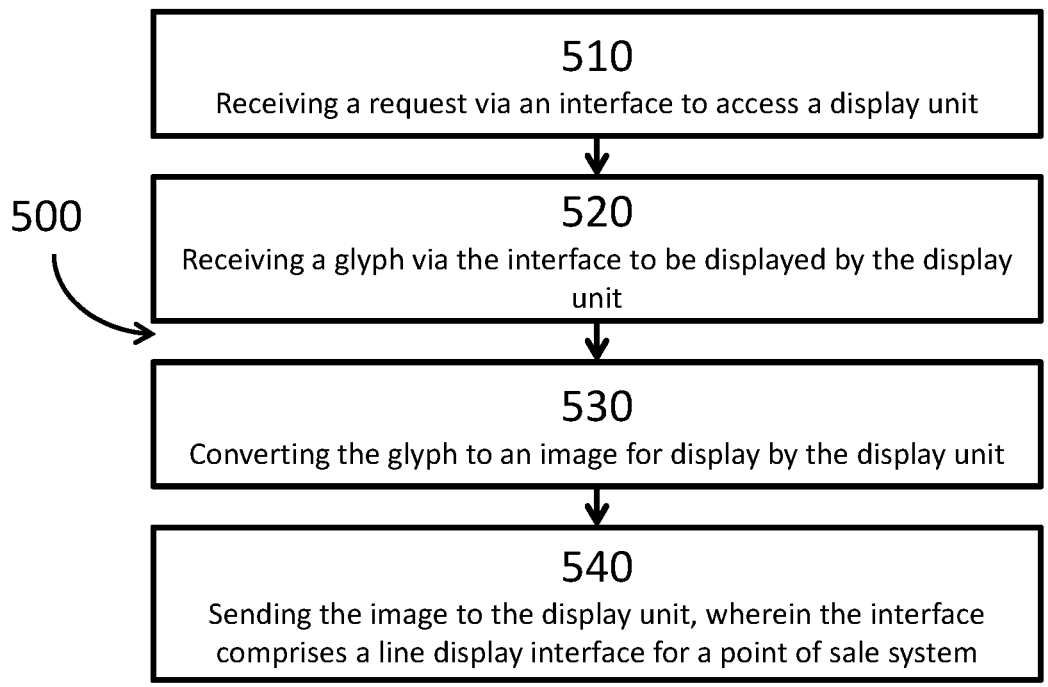
FIG. 5 shows a method of converting glyphs to images for display by a display unit.

FIG. 5 shows a method 500 of converting glyphs to images for display by a display unit. The method 500 includes receiving a request via an interface to access a display unit 510. The method 500 includes receiving a glyph via the interface to be displayed by the display unit 520. The method 500 includes converting the glyph to an image for display by the display unit 530. The method 500 includes sending the image to the display unit, wherein the interface comprises a line display interface for a point of sale system 540.

Figure 6:
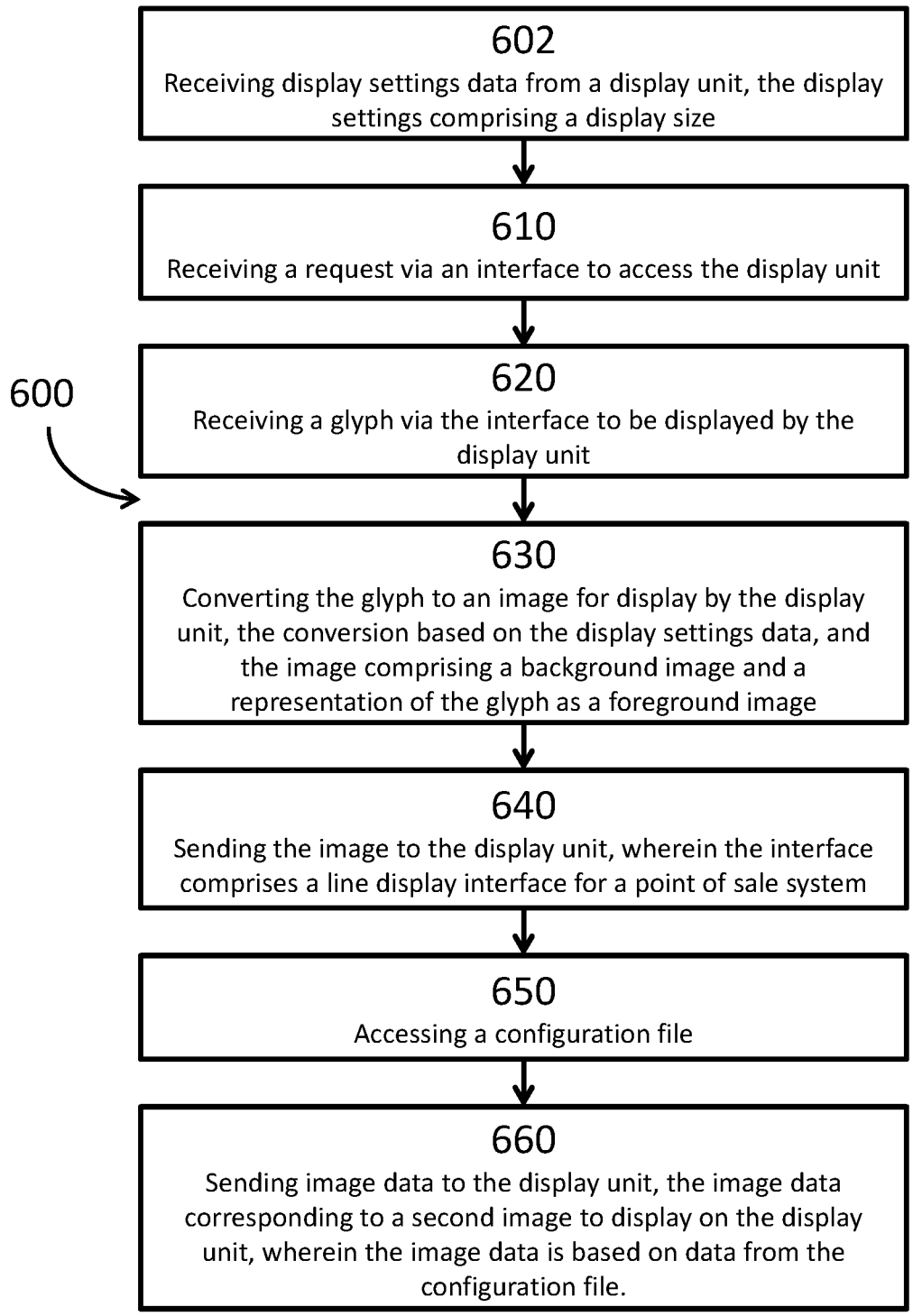
FIG. 6 shows a method of converting glyphs to images for display by a display unit.

FIG. 6 shows a method 600 of converting glyphs to images for display by a display unit. The method 600 includes receiving display settings data from a display unit, the display settings comprising a display size 602. The method 600 includes receiving a request via an interface to access the display unit 610. The method 600 includes receiving a glyph via the interface to be displayed by the display unit 620. The method 600 includes converting the glyph to an image for display by the display unit, the conversion based on the display settings data, and the image comprising a background image and a representation of the glyph as a foreground image 630. The method 600 includes sending the image to the display unit, wherein the interface comprises a line display interface for a point of sale system 640. The method 600 includes accessing a configuration file 650. The method 600 includes sending image data to the display unit, the image data corresponding to a second image to display on the display unit, wherein the image data is based on data from the configuration file 660.

In various examples, the line display mode for the display unit may be implemented as a window or an overlay. The window or overlay may be created or brought to the foreground when the display unit enters line display mode. The window or overlay may obscure all or part of a window used while the display unit is in idle mode. When the display unit exits line display mode, the line display window or overlay may be closed, hidden, or sent to the background.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a processor;
a display unit coupled to the processor; and
storage coupled to the processor to store computer-readable instructions, wherein execution of the computer-readable instructions by the processor causes the processor to:
receive a request to access the display unit via a method call to a line display interface, wherein the line display interface comprises a set of methods for controlling a line display unit;
send an access command to the display unit to enter a line display mode in response to receiving the request;
receive a glyph via the line display interface to be displayed on the display unit;
convert the glyph to an image; and
send the image to the display unit to display.

2. The system of claim 1, wherein the processor sends the image to the display unit via a video signal.

3. The system of claim 1, wherein execution of the computer-readable instructions causes the processor to interface with the display unit as the line display unit.

4. The system of claim 1, wherein the glyph comprises price data and unit quantity data and wherein the computer-readable instructions, when executed by the processor, cause the processor to store the price data and unit quantity data in the storage.

5. The system of claim 1, wherein the computer-readable instructions, when executed by the processor, cause the processor to:
receive a relinquish access command via the line display interface;
send a second image to the display unit for display, based on receipt of the relinquish access command; and
send a command to the display unit to exit line display mode in response to receipt of the relinquish access command.

6. A non-transitory computer-readable medium storing computer-readable instructions that, when executed by a processor, cause the processor to:
instantiate a line display interface that comprises a set of methods for controlling a line display unit;
receive a request to access a display unit via a method call to the line display interface;
receive a glyph via the line display interface to be displayed on the display unit;
convert the glyph to an image; and
send the image to the display unit for display.

7. The computer-readable medium of claim 6, wherein the computer-readable instructions, when executed by the processor, cause the processor to:
send a command to the display unit to enter a line display mode in response to receipt of the request to access the display unit;
receive a relinquish access command via the line display interface;
send image data to the display unit corresponding to a second image to display in an idle mode; and
send another command to the display unit to enter the idle mode.

8. The computer-readable medium of claim 7, wherein the image data comprises a uniform resource locator (URL) identifying a storage location on a network.

9. The computer-readable medium of claim 8, wherein the storage location comprises a folder, and wherein the folder comprises the second image.

10. The computer-readable medium of claim 6, wherein the computer-readable instructions, when executed by the processor, cause the processor to:
receive display settings from the display unit; and
modify the conversion of the glyph to the image based on the display settings.

11. A method comprising:
receiving a request to access a display unit via a method call to a line display interface, wherein the line display interface comprises a set of methods for controlling a line display unit;
receiving a glyph via the interface to be displayed by the display unit;
converting the glyph to an image for display by the display unit; and
sending the image to the display unit, wherein the line display interface comprises an interface for a point of sale system.

12. The method of claim 11 comprising receiving display settings data from the display unit, wherein the converting the glyph to an image is based on the display settings data.

13. The method of claim 12, wherein the display settings data comprises a display size.

14. The method of claim 11, wherein the image comprises a background image and a representation of the glyph as a foreground image.

15. The method of claim 11 comprising:
accessing a configuration file; and
sending image data to the display unit, the image data corresponding to a second image to display on the display unit, wherein the image data is based on data from the configuration file.

* * * * *